United States Patent
Chen et al.

(10) Patent No.: US 10,586,979 B2
(45) Date of Patent: Mar. 10, 2020

(54) SULFUR-CARBON COMPOSITE COMPRISING A HIGHLY GRAPHITIC CARBON MATERIAL FOR LITHIUM-SULFUR BATTERIES AND PROCESS FOR PREPARING THE SAME

(71) Applicants: Robert Bosch GmbH, Stuttgart (DE); Institute of Chemistry, Chinese Academy of Sciences, Beijing (CN)

(72) Inventors: Yunhua Chen, Shanghai (CN); Juan Zhang, Beijing (CN); NaHong Zhao, Shanghai (CN); Yaxia Yin, Beijing (CN); Yuguo Guo, Beijing (CN)

(73) Assignees: Robert Bosch GmbH, Stuttgart (DE); Institute of Chemistry, Chinese Academy of Sciences, Beijing (CN)

( * ) Notice: Subject to any disclaimer, the term of this patent is extended or adjusted under 35 U.S.C. 154(b) by 4 days.

(21) Appl. No.: 15/771,498

(22) PCT Filed: Nov. 13, 2015

(86) PCT No.: PCT/CN2015/094586
§ 371 (c)(1),
(2) Date: Apr. 27, 2018

(87) PCT Pub. No.: WO2017/079976
PCT Pub. Date: May 18, 2017

(65) Prior Publication Data
US 2018/0351166 A1 Dec. 6, 2018

(51) Int. Cl.
H01M 4/36 (2006.01)
H01M 4/38 (2006.01)
(Continued)

(52) U.S. Cl.
CPC ............ H01M 4/366 (2013.01); C01B 17/00 (2013.01); C01B 32/174 (2017.08);
(Continued)

(58) Field of Classification Search
None
See application file for complete search history.

(56) References Cited

U.S. PATENT DOCUMENTS

2015/0246816 A1   9/2015   Liu et al.

FOREIGN PATENT DOCUMENTS

| CN | 103958402 | 7/2013 |
| CN | 103959517 | 7/2013 |
| CN | 104272506 | 1/2015 |

OTHER PUBLICATIONS

Wang et al., Infiltrating sulfur in hierarchical architecture MWCNT@meso C core-shell nanocomposites for lithium-sulfur batteries, Phys Chem Chem Phys, 15, 9051-9057. (Year: 2013).*

(Continued)

*Primary Examiner* — Daniel S Gatewood
(74) *Attorney, Agent, or Firm* — Michael Best & Friedrich LLP (57) ABSTRACT

Provided is a sulfur-carbon composite comprising a highly graphitic carbon material and sulfur, wherein the carbon material has a high graphitization degree characterized by a ratio of the intensity of G band to the intensity of D band in Raman spectrum being more than 1.0, the material is either a graphitic microporous carbon substrate, or a core-shell material with a conductive core coated by a graphitic microporous carbon layer, and wherein sulfur is encapsulated into the porous structure of the carbon material. Also provided are an electrode and a lithium-sulfur battery comprising the sulfur-carbon composite, and a process for preparing the sulfur-carbon composite.

7 Claims, 6 Drawing Sheets

(51) Int. Cl.

| | |
|---|---|
| *C01B 17/00* | (2006.01) |
| *C01B 32/198* | (2017.01) |
| *C01B 32/174* | (2017.01) |
| *H01M 4/62* | (2006.01) |
| *H01M 4/13* | (2010.01) |
| *H01M 4/139* | (2010.01) |
| *H01M 4/587* | (2010.01) |
| *C01B 32/205* | (2017.01) |
| *H01M 10/052* | (2010.01) |
| *H01M 4/02* | (2006.01) |

(52) U.S. Cl.
CPC .......... *C01B 32/198* (2017.08); *C01B 32/205* (2017.08); *H01M 4/13* (2013.01); *H01M 4/139* (2013.01); *H01M 4/364* (2013.01); *H01M 4/38* (2013.01); *H01M 4/587* (2013.01); *H01M 4/625* (2013.01); *C01P 2002/01* (2013.01); *C01P 2002/82* (2013.01); *C01P 2006/16* (2013.01); *C01P 2006/40* (2013.01); *H01M 10/052* (2013.01); *H01M 2004/021* (2013.01); *H01M 2004/028* (2013.01)

(56) References Cited

OTHER PUBLICATIONS

Zhou et al., Core shell sulfur polypyrrole nanoparticles sandwiched in graphene sheets as cathode for lithium sulfur batteries, J Ener Chem, 24, 448-455 (Year: 2015).*
International Search Report for Application No. PCT/CN2015/094586 dated Aug. 18, 2016 (2 pages).
Jawhari et al., "Raman Spectroscopic Characterization of Some Commercially Available Carbon Black Materials," Carbon, 1995, 33(11)1561-1565.

* cited by examiner

SULFUR-CARBON COMPOSITE COMPRISING A HIGHLY GRAPHITIC CARBON MATERIAL FOR LITHIUM-SULFUR BATTERIES AND PROCESS FOR PREPARING THE SAME

BACKGROUND OF THE INVENTION

The present invention relates to a sulfur-carbon composite comprising a highly graphitic carbon material for lithium-sulfur batteries, an electrode and a lithium-sulfur battery comprising said composite as well as a process for preparing said sulfur-carbon composite.

Lithium-Sulfur batteries are nowadays undergoing a tremendous number of investigations due to the highly theoretical energy density of 2600 Wh kg$^{-1}$. However, Li—S batteries are still suffer from poor cycling life and rate performance due to the intrinsic insulate sulfur/lithium sulfides and dissolution of intermediate polysulfide species for irreversible loss. Porous carbon is proven as an effective matrix in trapping polysulfides within pore structures, hence enhancing the capacity retention capability. Highly graphitic carbon materials, which always require an intense preparation condition, benefit for enhancing electro-activity of sulfur, and facilitating transportation of electrons and ions. Different porous carbon had been designed to accommodate sulfur, however, integrating all the structural benefits such as ample space, highly graphitic domains, interconnected ion channels, and confined nanospace with a facile approach to utilize and immobilize sulfur has still not been fully demonstrated.

To provide good electronic conductive network and confine polysulfide intermediates, porous carbon framework with a certain degree of graphitization has been used as an effective matrix to immobilize sulfur. However, current synthetic methods are usually complex, and the degree of graphitization of these porous carbon materials is very low, which lies as big obstacle for achieving highly cycling stability and highly-rate capability.

SUMMARY OF INVENTION

It is therefore an object of the present invention to provide a highly graphitic carbon material (also referred to as "highly graphitic carbon(s)", and abbreviated as "HGC" or "HGCs") characterized by its high graphitization degree, which is suitable to be used in Li—S batteries. Also, an object of the present invention is to provide a simple and facile method to synthesize said highly graphitic carbon material by co-pyrolyzing carbon-containing raw materials with transition metal-containing salts, which makes it possible to solve the above problems.

To be more specific, the present invention provides a sulfur-carbon composite comprising a highly graphitic carbon material and sulfur, wherein the highly graphitic carbon material has a high graphitization degree characterized by a ratio of the intensity of G band to the intensity of D band in Raman spectrum being more than 1.0, and wherein sulfur is encapsulated into the porous structure of the highly graphitic carbon material.

Said highly graphitic carbon material can be either a graphitic microporous carbon substrate, or a core-shell material with a conductive core coated by a graphitic microporous carbon layer. In the context of the present invention, "a graphitic microporous carbon layer" in the core-shell structure indicates that a microporous carbon layer has been graphitized. The conductive core either has microporous structure itself, or has non-microporous structure which is coated by a microporous graphitic carbon layer.

The present invention provides an electrode, which comprises the sulfur-carbon composite of the present invention.

The present invention further provides a lithium-sulfur battery, which comprises the sulfur-carbon composite of the present invention.

The present invention also provides a process for preparing the above sulfur-carbon composite, and the process will be discussed in the following description in more details.

In the context of the present specification, abbreviations for the used materials will be adopted, for example, CNT stands for carbon nanotubes, GN stands for graphene nanosheets, MPCS stands for microporous carbon spheres and HGCS stands for highly graphitic carbon spheres.

The symbol "@" denotes that the substance used before the symbol is stacked or coated by the substance used after the symbol. Accordingly, the expression "CNT@HGC", indicates that the carbon nanotubes are stacked or coated by the highly graphitic carbon, and furthermore, the abbreviation "CNT@HGC-S" or "S/(CNT@HGC)" indicates that CNT@HGC is loaded with sulfur. Similarly, the expression "GN@HGC", indicates that the graphene nanosheets are stacked or coated by the highly graphitic carbon, and moreover, the abbreviation "GN@HGC-S" or "S/(GN@HGC)" indicates that GN@HGC is further loaded with sulfur.

Further, in certain steps of the inventive process for preparing the sulfur-carbon composite, a "CNT@MO" (M stands for the transition metal and MO stands for transition metal oxide) may be formed first since the CNT is mixed with an aqueous solution of transition metal-containing salt and kept at 60-120° C. until the CNT is stacked or coated by the transition metal oxide. Then, the formed "CNT@MO" is mixed with carbon source to carry out a hydrothermal reaction, and accordingly a "CNT@MO@HGC" will be prepared by pyrolysis. MO in the "CNT@MO@HGC" can be easily removed by an acid solution so as to obtain CNT@HGC.

According to the present invention, these highly graphitic carbon materials exhibit three-dimensional porous framework of macropores together with mesopores and micropores, not only providing host for sulfur but also rendering easy access for facile Li+ migration. On one hand, the nanostructure and highly electrical conductivity of the sp2 carbon create short diffusion path for fast lithium ion diffusion, thus facilitate highly capacity and rate performance. On the other hand, the ample pores serve as reservoirs for the sulfur storage, to confine polysulfide anions dissolution, which is beneficial for cycling stability.

These unique characteristics permit that HGCs could act as promising hosts for confining sulfur for highly performance Li—S batteries showing highly specific capacity, low resistance, excellent rate performance, and favorable cyclic stability.

DETAILED DESCRIPTION

The present invention relates to novel sulfur-carbon cathode composite, as well as their structural design, and corresponding preparation method. The present invention also provides lithium-sulfur batteries assembled from said cathode composite. The battery testing system and the electrolytes employed are also described.

In an embodiment of the present invention, a sulfur-carbon composite comprising a highly graphitic carbon material and sulfur is provided, wherein the highly graphitic carbon material is a graphitic microporous carbon substrate, the graphitization degree of the highly graphitic carbon material is characterized by a ratio of the intensity of G band to the intensity of D band in Raman spectrum being more than 1.0, and wherein sulfur is encapsulated into the porous structure of the highly graphitic carbon material.

In a further embodiment of the present invention, the graphitic microporous carbon substrate prior to graphitization can be selected from the group consisting of carbon spheres, carbon nanosheets, carbon fibers, carbon nanotubes, carbon molecular sieve, and zeolite-templated carbon, and combinations, composites, derivatives and doped system thereof.

In another embodiment of the present invention, a sulfur-carbon composite comprising a highly graphitic carbon material and sulfur is provided, wherein the highly graphitic carbon material is a core-shell material with a conductive core coated by a graphitic microporous carbon layer, the graphitization degree of the highly graphitic carbon material is characterized by a ratio of the intensity of G band to the intensity of D band in Raman spectrum being more than 1.0, and wherein sulfur is encapsulated into the porous structure of the highly graphitic carbon material.

In a further embodiment of the present invention, the conductive core can be selected from the group consisting of carbon-based material, non-carbon material, and a combination or composite of carbon-based material and non-carbon material.

With respect to the carbon-based material, any commonly used carbon-based material in the art can be applied in the present invention and the non-limiting examples include one or more selected from the group consisting of amorphous carbon, graphitized carbon, hard carbon, soft carbon, activated carbon, carbon aerogels, carbon nanotubes, expanded graphite, graphene oxide nanosheets, graphene nanosheets, carbide-derived carbon and zeolite-templated carbon, carbon molecular sieve and combinations, composites, derivatives and doped system thereof. Preferably, the carbon-based material is carbon nanotubes or graphene nanosheets. The "doped system" in the context of the present invention means that the system can be doped with any suitable heteroatoms or combinations of them, such as N, P, B and so on.

With respect to the non-carbon material, any commonly used non-carbon material in the art can be applied in the present invention and the non-limiting examples include one or more selected from the group consisting of conductive polymers, semi-conductive ceramic, metal-organic frameworks (MOFs), non-carbon molecular sieves and combinations, composites, derivatives thereof.

In a still further embodiment of the present invention, the highly graphitic carbon material has a porous structure with pore diameter being 0.4 nm-100 nm, preferably 0.4-50 nm.

In another embodiment of the present invention, the highly graphitic carbon material has a BET specific surface area ranging from 100-4500 m$^2$/g, preferably from 500-1500 m$^2$/g.

In another embodiment of the present invention, the highly graphitic carbon material has a pore volume of 0.1-3.0 cm$^3$/g, preferably 0.3-1.5 cm$^3$/g.

In another embodiment of the present invention, the sulfur-carbon composite has sulfur content of 20-90 wt %, preferably 50-85 wt % based on the total weight of the sulfur-carbon composite.

Figure 1A:
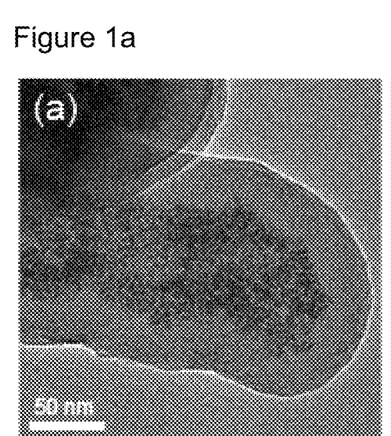
FIGS. 1a-d show a Transmission Electron Microscopy (TEM) image of CNT@Fe$_x$O$_y$@C (C stands for carbon source) (before pyrolysis) (a); CNT@Fe$_x$O$_y$@HGC (after pyrolysis, but before acid etching of Fe$_x$O$_y$ nanoparticles) (b); CNT@HGC (after acid etching of Fe$_x$O$_y$ nanoparticles) (c); and Scanning Electron Microscopy (SEM) image of S/(CNT@HGC) (d) obtained in Example 1 of the present invention. Hereinafter, "Fe$_x$O$_y$" stands for any possible iron oxide existed in the inventive process.
Figure 1B:
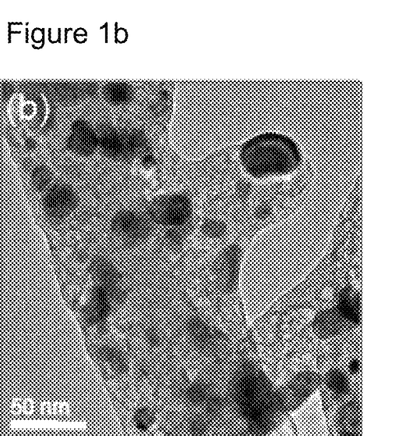
Figure 1C:
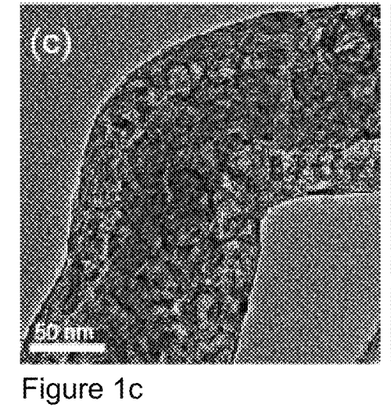
Figure 1D:
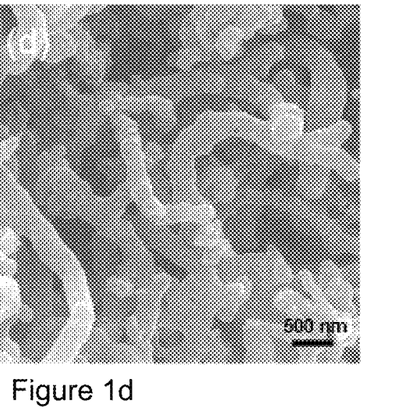

In a specific embodiment of the sulfur-carbon composite according to the present invention, the highly graphitic carbon material is carbon nanotube coated by a graphitic microporous carbon layer. As shown in FIG. 1a, $Fe_xO_y$ nanoparticles (briefed as $Fe_xO_y$ NPs) (NP stands for nanoparticles) grow on the surface of carbon and the thickness of the coating layer outside the CNT before pyrolysis is about 20 nm. In FIG. 1b, after pyrolysis at 800° C., lots of graphitic domains can be clearly observed. Through the acid etching treatment, the $Fe_xO_y$ NPs got completely removed to yield CNT@HGC as shown in FIG. 1c. After sulfur loading process, no bulk sulfur particles can be observed in the CNT@HGC-S composite, implying the good dispersion of sulfur within the highly graphitic carbon layer, as shown in FIG. 1d.

Figure 2:
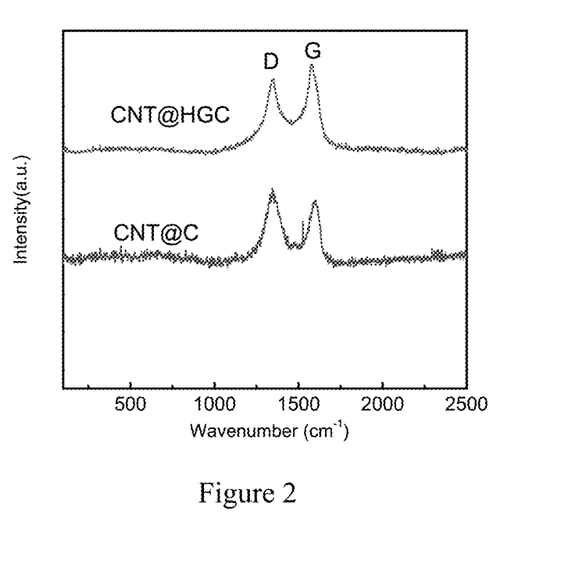
FIG. 2 shows the Raman spectra of CNT@HGC with transition metal containing salt and CNT@C without transition metal containing salt, respectively obtained in Example 1 and Comparative Example 1 of the present invention.
Figure 3A:
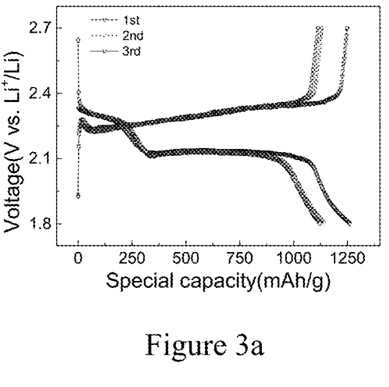
FIGS. 3a-d show the first three discharge/charge curves at C/10 of S/(CNT@HGC) (sulfur content 65 wt %) (a) and S/(CNT@C) (b); cycling comparison of S/(CNT@HGC) and S/(CNT@C) cycled at C/10 for 200 cycles (c); and the rate performance of S/(CNT@HGC) cathode and S/(CNT@C) cathode at rate of 0.1C, 0.2C, 0.4C, 1C, 2C and 5C obtained in Example 1 and Comparative Example 1 of the present invention.
Figure 3B:
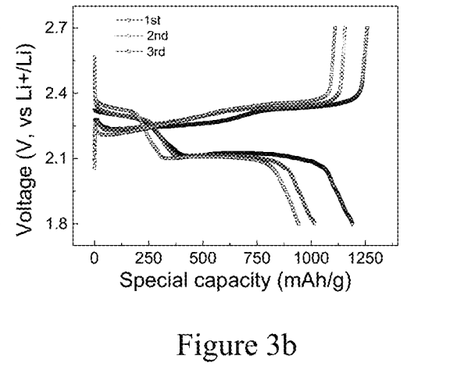
Figure 3C:
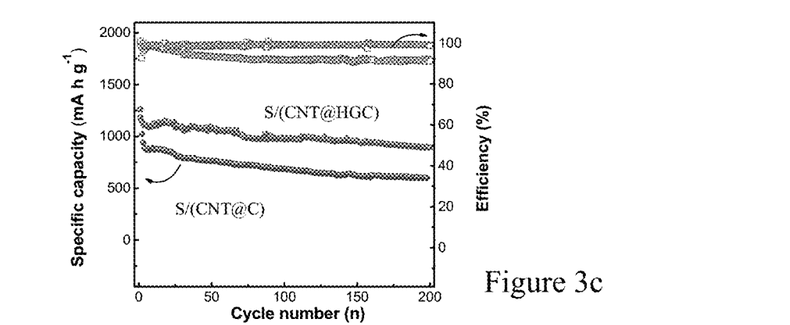
Figure 3D:
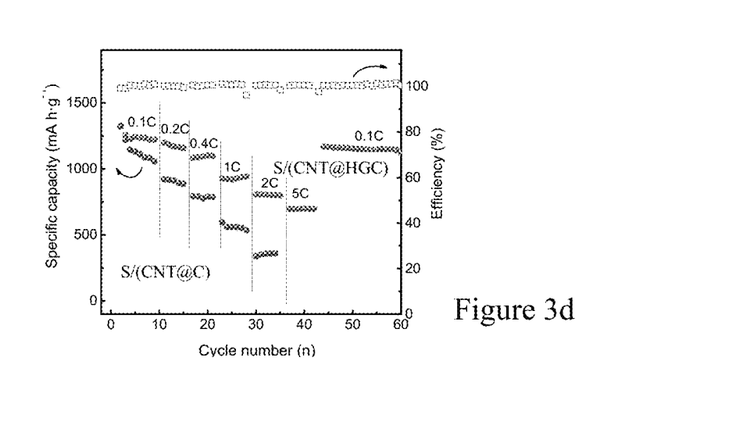

The Raman spectra of CNT@HGC substrate in FIG. 2 exhibits a greatly sharpened G band compared to CNT@C (the carbon layer outside the CNT is not graphitized), confirming the enhanced graphitization degree. The mean $I_G/I_D$ ratios of CNT@HGC (1.04) were larger than that of CNT@C (0.63), demonstrating the increased graphitic degree of CNT@HGC.

Figure 4A:
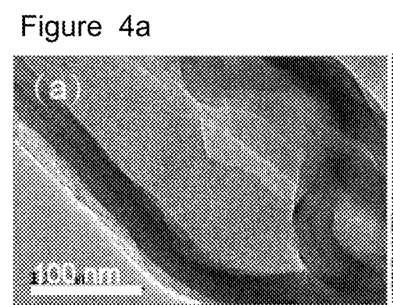
FIGS. 4a-d show a Transmission Electron Microscopy (TEM) image of GN@$Fe_xO_y$@C (before pyrolysis) (a); GN@$Fe_xO_y$@HGC (after pyrolysis, but before acid etching of $Fe_xO_y$ nanoparticles) (b); GN@HGC (after acid etching of $Fe_xO_y$ nanoparticles)(c); and S/(GN@HGC) (d) obtained in Example 2 of the present invention.
Figure 4B:
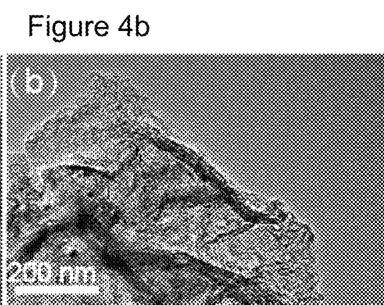
Figure 4C:
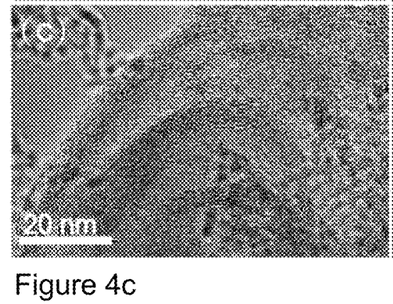
Figure 4D:
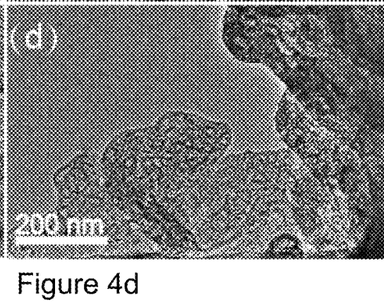

In another embodiment of the sulfur-carbon composite according to the present invention, the highly graphitic carbon material is graphene nanosheet coated by a graphitic carbon layer. As shown in FIG. 4a, the thickness of the amorphous carbon layer outside the graphene nanosheet is about 20 nm. Through acid etch treatment, GN@HGC was yield as shown in FIG. 4b. The highly-resolution TEM image as shown in FIG. 4c gives an evident observation of the activated graphitic domains. After sulfur-loading process, no bulk sulfur particle can be observed from the GN@HGC-S composite as shown in FIG. 4d, implying the good dispersion of sulfur within the highly graphitic carbon layer. For comparison, GN@C substrate is prepared without $Fe_xO_y$ NPs, which possesses a low degree of graphitization.

Figure 5:
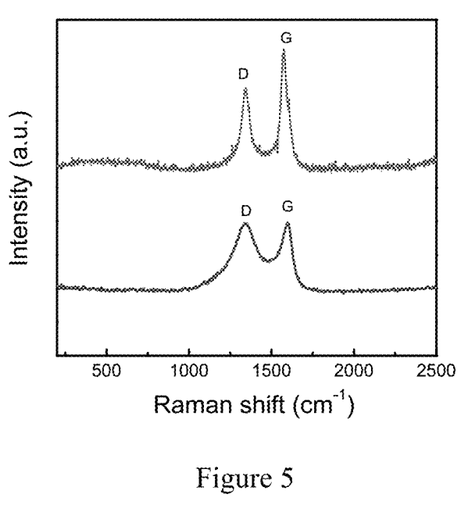
FIG. 5 shows the Raman spectra of GN@HGC with transition metal containing salt, and GN@C without transition metal containing salt, respectively obtained in Example 2 and Comparative Example 2 of the present invention.
Figure 6A:
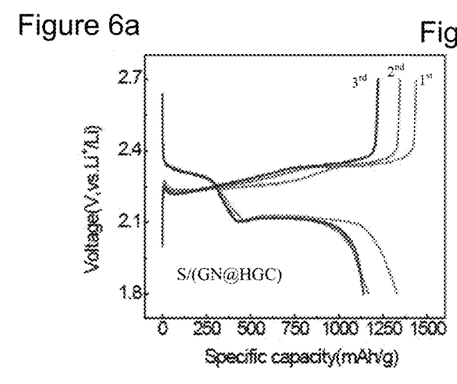
FIGS. 6a-d show the first three discharge/charge curves at C/10 of S/(GN@HGC) (sulfur content 65 wt %) (a) and S/(GN@C) (b); cycling comparison of S/(GN@HGC) and S/(GN@C) cycled at C/10 for 200 cycles (c); and the rate performance of S/(GN@HGC) cathode and S/(GN@C) cathode at rate of 0.1C, 0.2C, 0.5C, 1C, 2C and 5C obtained in Example 2 and Comparative Example 2 of the present invention.
Figure 6B:
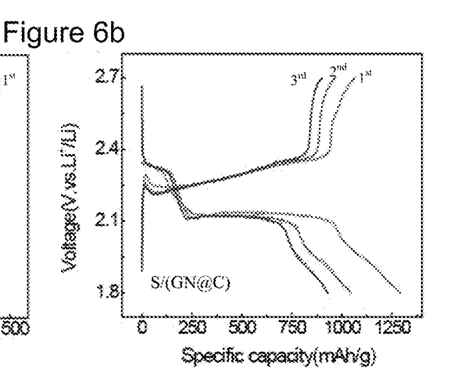
Figure 6C:
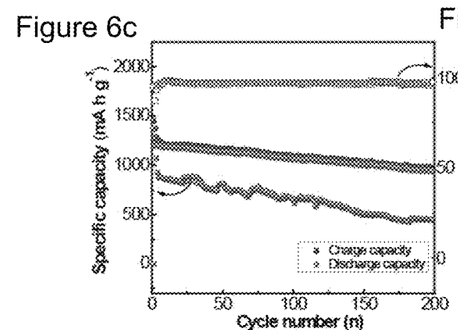
Figure 6D:
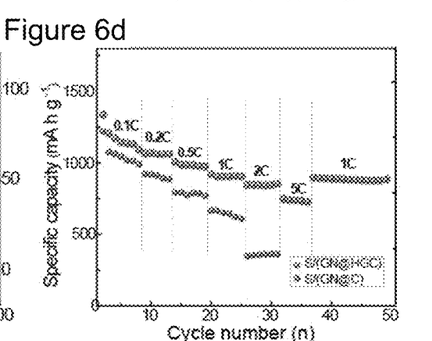

In FIG. 5, for GN@HGC, a clear Raman band at 1343 and 1574 $cm^1$ corresponds to D and G bands of carbon respectively. Whereas, GN@C substrate only exhibits the conventional D band and G band at 1339 and 1596 $cm^1$ respectively. The obviously sharpened G band shows an increase of the ordered graphitic domains in GN@HGC. Meanwhile, the mean $I_G/I_D$ ratios of GN@HGC (1.23) were larger than that of GN@C (0.82), reaffirming the increased graphitic degree of GN@HGC.

Figure 7A:
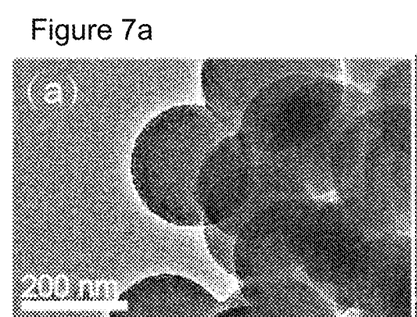
FIGS. 7a-d show the TEM images of MPCS precursors (a); MPCS@$Fe_xO_y$ composite (before pyrolysis) (b); HGCS obtained from MPCS (c), and HGCS-S (d) obtained in Example 3 of the present invention.
Figure 7B:
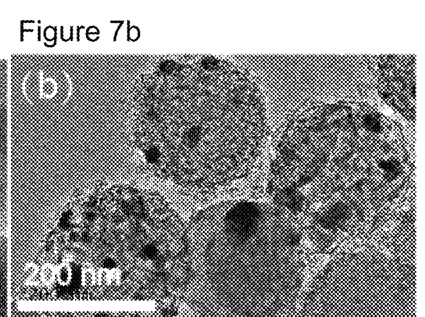
Figure 7C:
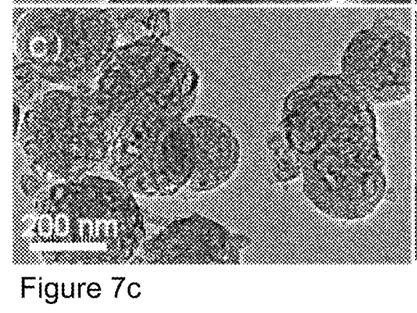
Figure 7D:
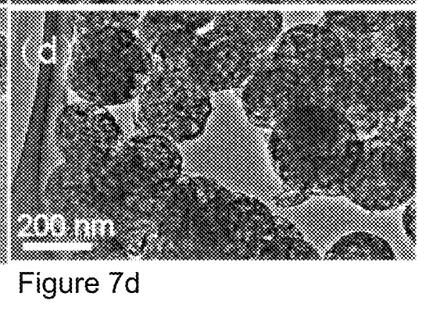

In a further embodiment of the sulfur-carbon composite according to the present invention, the highly graphitic carbon material is graphitic microporous carbon spheres. As shown in TEM of FIG. 7a, the spherical structure of MPCS has a particle size of about 200 nm. Upon pyrolysis with ferric sulphates, HGCS (highly graphitic carbon spheres) is obtained with $Fe_xO_y$ NPs embedded inside, as shown in FIG. 7b. And then, these $Fe_xO_y$ NPs can be completely removed through acid etching process. After sulfur-loading process, no bulk sulfur particles can be observed from the S/HGCS composite, as shown in FIG. 7c, implying the good dispersion of sulfur within the highly graphitic carbon substrate. For comparison, MPCS substrate without $Fe_xO_y$ NPs is prepared, possessing a low degree of graphitization.

Figure 8:
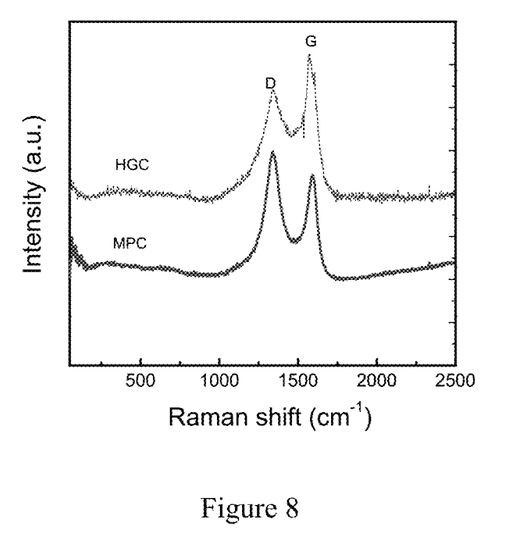
FIG. 8 shows the Raman spectra of HGCS obtained from MPCS, and MPCS respectively obtained in Example 3 and Comparative Example 3 of the present invention.
Figure 9A:
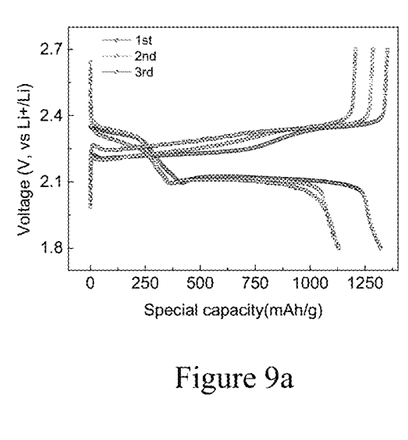
FIGS. 9a-d show the first three discharge/charge curves at C/10 of HGCS-S (sulfur content 65 wt %) (a) and MPCS-S (b); cycling comparison of HGCS-S and MPCS-S cycled at C/10 for 200 cycles (c); and the rate performance of HGCS-S cathode and MPCS-S cathode at rate of 0.1C, 0.2C, 0.5C, 1C, and 2C obtained in Example 3 and Comparative Example 3 of the present invention.
Figure 9B:
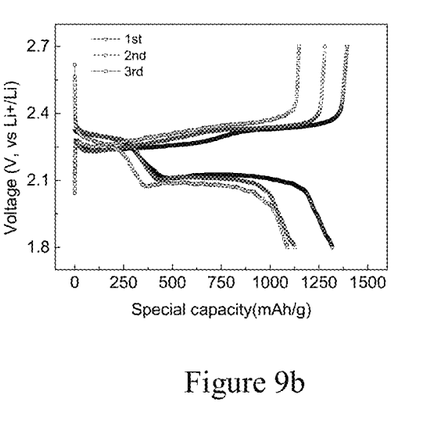
Figure 9C:
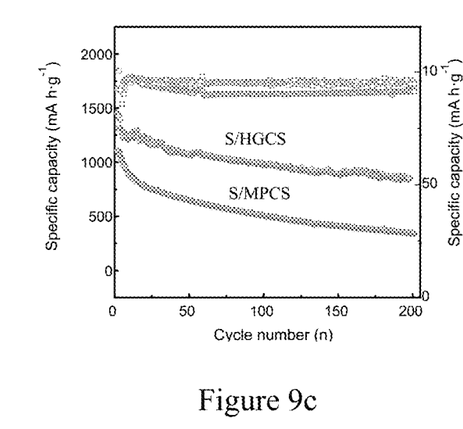
Figure 9D:
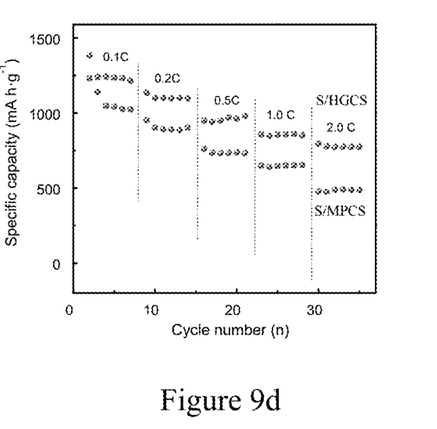

Raman spectra in FIG. 8 exhibits the significantly decreased $I_G/I_D$ (0.74) for MPCS substrate compared to HGCS (1.28), exhibiting the distinct improvement of the graphitization degree of HGCS.

The present invention further relates to an electrode, which comprises the sulfur-carbon composite according to the present invention.

The present invention further relates to a lithium-sulfur battery, which comprises the sulfur-carbon composite according to the present invention.

In one embodiment of the present invention, a process for preparing the above sulfur-carbon composite is provided, wherein the highly graphitic carbon material is a conductive core coated by a graphitic microporous carbon layer, said process comprises the steps of: mixing an aqueous solution of the conductive core with an aqueous solution of transition metal-containing salt, keeping at 60-120° C. for 2-12 h to obtain the conductive core coated by transition metal oxide layer; then carrying out a hydrothermal reaction (for example, in an sealed autoclave at 150-200° C. for 5 h-20 h) by adding carbon source to the above resulting material, followed by centrifuging, washing and drying; pyrolyzing the above obtained material at a temperature of 500-900° C. for 1-12 h; removing the transition metal oxide by an acid solution; and loading of sulfur.

Alternatively, the above process may be carried out by the following steps of: mixing an aqueous solution of the conductive core with an aqueous solution of transition metal-containing salt and carbon source at the same time; then carrying out a hydrothermal reaction (for example, in an sealed autoclave at 150-200° C. for 5 h-20 h), followed by centrifuging, washing and drying; pyrolyzing the above obtained material at a temperature of 500-900° C. for 1-12 h; removing the transition metal oxide by an acid solution; and loading of sulfur.

In the context of the present invention, "a hydrothermal reaction" intends to mean that during the reaction in aqueous solutions occurred at high vapor pressures and high temperature, a carbonaceous layer is formed on a MO coated substrate materials, or during the reaction, both a MO layer and a carbonaceous layer are formed simultaneously on the core materials.

In another embodiment of the present invention, a process for preparing the above sulfur-carbon composite is provided, wherein the highly graphitic carbon material is a graphitic microporous carbon substrate, said process comprises the steps of: dispersing a microporous carbon substrate in an aqueous solution of transition metal-containing salt, stirring and heating at 60-120° C. for 2-12 h; pyrolyzing the obtained material at a temperature of 500-900° C. for 1-12 h to carbonize and graphitize the microporous carbon substrate; removing the transition metal oxide by an acid solution, and loading of sulfur.

In a further embodiment of the present invention, said carbon source is one or more selected from the group consisting of sucrose, D-glucose, fructose, polyaniline, polyacetylene, polythiophene, dopamine and sodium alginate.

In a further embodiment of the present invention, the transition metal-containing salt is selected from the group consisting of chloride, sulfate, nitrate, acetate, carbonate and phosphate of Fe, Co and Ni.

In a specific embodiment of the present invention, the carbon source is for example sucrose, the transition metal-containing salt is Fe-containing salt, and the molar ratio of Fe-containing salt to sucrose is preferably ranging from 0.2 to 2.5.

In a further specific embodiment of the present invention, the microporous carbon substrate is microporous carbon spheres, the transition metal-containing salt is $FeSO_4$, and the weight ratio of $FeSO_4$ to microporous carbon spheres is preferably ranging from 0.2 to 10.

In another embodiment of the present invention, the step of loading of sulfur comprises dissolving elemental sulfur, which is nonpolar, in one nonpolar solvent for example, dimethyl sulfoxide (DMSO) or dimethylformamide (DMF) with intense ultrasonication. The ratios of sulfur in the mixture can be adjusted from 50% to 80%. Then, the HGC substrate was dispersed in the sulfur/DMSO (for example) solution by ultrasonication. With the addition of another polar solvent (deionized water or ethonal for example), sulfur particles precipitated from the solution and deposited on the well-dispersed HGC substrate that provides abundant adhesion points for sulfur deposition. After dried at 80° C. overnight, the final product HGC-S was obtained.

The highly graphitic carbon substrate according to the present invention has favorable electric conductivity, thus is very promising in use as the substrate material for sulfur to form the sulfur-carbon composite for Li—S battery. Moreover, the preparation process is simple to implement, and all raw materials are low in price, all these merits make the composite very promising for Li—S batteries.

Potential applications of the composite according to the present invention include highly-energy-density lithium ion batteries with acceptable highly power density for energy storage applications, such as power tools, photovoltaic cells and electric vehicles.

EXAMPLES

The following non-limiting examples illustrate various features and characteristics of the present invention, which is not to be construed as limited thereto:

Example 1

Preparation of CNT@HGC

Method 1: Firstly, commercial CNT was pretreated with nitric acid to grow more oxygen-containing functional groups. 200 mL of CNT (0.50 mg/mL) was ultrasonicated for 50 min to form a homogeneous suspension. $Fe_xO_y$ nanoparticles ($Fe_xO_y$ NPs) were grown via the in situ hydrolysis of Fe-containing salts on the pretreated CNTs. Typically, for the synthesis of CNTs@$Fe_xO_y$, 48 mg of $FeCl_3$ and 760 mg of $FeCl_2$ were first dissolved in 100 mL of $H_2O$ and then added to 160 mL of CNT suspension (0.50 mg/mL) and kept at 90° C. for 4 h. Then 80 mg of as-prepared CNT@$Fe_xO_y$ composite and 2 g of sucrose were added into 40 mL of water, and sonicated for 1 h, to form a homogenous black suspension. The suspension was then sealed in a 70 mL Parr autoclave with a quartz linear and was heated at 180° C. for 15 h to yield a dark brown precursor. After the hydrothermal reaction, a uniform carbon precursor layer was formed on the CNT@$Fe_xO_y$ composite. The precursor was collected by centrifugation, washed with de-ionized water for four times, and then dried at 60° C. overnight. The dried precursor was calcined under argon at 800° C. for 3 h, with a heating rate of 3° C./min and a flow rate of 50 mL min$^{-1}$. To remove the $Fe_xO_y$ NPs, the composite was stirred in HCl solution at room temperature for 48 h to obtain the CNT@HGC.

Method 2: Firstly, commercial CNT was pretreated with nitric acid to grow more oxygen-containing functional groups. Then 100 mg of as-prepared CNTs, 1 g of sucrose, and 500 mg of ferric nitrate were added into 40 mL of water, and sonicated for 1 h, to form a homogenous black suspension. The suspension was then sealed in a 70 mL Parr autoclave with a quartz linear and was heated at 180° C. for 15 h to yield a dark brown precursor. After the hydrothermal reaction, a uniform carbon precursor layer was formed on the CNT with $Fe_xO_y$ nanoparticles embedded inside. The precursor was collected by centrifugation, washed with de-ionized water for four times, and then dried at 60° C. overnight. The dried precursor was calcined under argon at 800° C. for 3 h, with a heating rate of 3° C./min and a flow rate of 50 mL min$^1$. To remove the $Fe_xO_y$ NPs, the composite was stirred in HCl solution at room temperature for 48 h to obtain the CNT@HGC.

Preparation of CNT@HGC-S

Elemental sulfur, which is nonpolar, was dissolved in nonpolar DMSO solvent with intensive ultrasonication. The ratio of sulfur in the mixture was 80%. Then, the above obtained CNT@HGC in Method 1 was dispersed in the sulfur/DMSO solution by ultrasonication. With the addition of the other polar deionized water solvent, sulfur particles precipitated from the solution and deposited on the well-dispersed CNT@HGC that provides abundant adhesion points for sulfur deposition. After dried at 80° C. overnight, the final product CNT@HGC-S was obtained.

Electrochemical Test

Electrochemical measurements were performed with coin cells assembled in an argon-filled glovebox. For preparing working electrodes, a mixture of active material, carbon black, and poly-(vinyl difluoride) (PVDF) at a weight ratio of 80:10:10 was pasted on a Al foil. Lithium foil was used as the counter electrode. A glass fiber (GF/D) from Whatman was used as a separator. The electrolyte consisted of a solution of 1 M LiTFSI salt in a mixture of DOL and DME (1:1, v/v) (1:1 in wt %) (Zhangjiagang Guotai Huarong New Chemical Materials Co., Ltd.). Galvanostatic cycling of the assembled cells was carried out using a battery testing system in the voltage range of 1-3 V (vs Li+/Li).

Comparative Example 1

The steps in Example 1 were repeated in Comparative Example 1 except that no transition metal-containing salt was added and the carbon source added was not graphitized.

In FIG. 3, the obtained CNT@HGC-S cathode composite exhibits discharge capacity of 1260 mAh/g at C/10, and retains at 892 mAh/g after 200 cycles. Moreover, it shows an excellent rate performance. When increasing the current rates to 1C and 5C, the CNT@HGC-S cathode composite still achieves capacities of 926 mAh/g and 696 mAh/g. The specific capacity is calculated based on the mass of S.

Example 2

Preparation of GN@HGC

Method 1: Firstly, GO (graphene oxide) was pretreated through Hummer's method. Then 200 mL of GO solution (0.50 mg/mL) was ultrasonicated for 50 min to form a homogeneous suspension. $Fe_xO_y$ nanoparticles ($Fe_xO_y$ NPs) was grown via the in situ hydrolysis of Fe-containing salts on the pretreated GO. Typically, for the synthesis of GO@$Fe_xO_y$, 48 mg of $FeCl_3$ and 760 mg of $FeCl_2$ were first dissolved in 100 mL of $H_2O$ and then added to 160 mL of GO suspension (0.50 mg/mL) and kept at 90° C. for 4 h. Then 80 mg of as-prepared GO@$Fe_xO_y$ composite and 2 g of sucrose were added into 40 mL of water, and sonicated for 1 h, to form a homogenous black suspension. The suspension was then sealed in a 70 mL Parr autoclave with a quartz linear and was heated at 180° C. for 15 h to yield a dark brown precursor. After the hydrothermal reaction, a uniform carbon precursor layer was formed on the GO@$Fe_xO_y$ composite. The precursor was collected by centrifugation, washed with de-ionized water for four times, and then dried at 60° C. overnight. The dried precursor was calcined under argon at 800° C. for 3 h, with a heating rate of 3° C./min and a flow rate of 50 mL min$^1$. To remove the $Fe_xO_y$ NPs, the composite was stirred in HCl solution at room temperature for 48 h to obtain the GO@HGC.

Method 2: Firstly, GO (graphene oxide) was pretreated through Hummer's method. Then 100 mg of as-prepared GO, 1 g of sucrose, and 500 mg of ferric nitrate were added into 40 mL of water, and sonicated for 1 h, to form a homogenous black suspension. The suspension was then sealed in a 70 mL Parr autoclave with a quartz linear and was heated at 180° C. for 15 h to yield a dark brown precursor. After the hydrothermal reaction, a uniform carbon precursor layer was formed on the CNTs with $Fe_xO_y$ nanoparticles embedded inside. The precursor was collected by centrifugation, washed with de-ionized water for four times, and then dried at 60° C. overnight. The dried precursor was calcined under argon at 800° C. for 3 h, with a heating rate of 3° C./min and a flow rate of 50 mL min[1]. To remove the $Fe_xO_y$ NPs, the composite was stirred in HCl solution at room temperature for 48 h to obtain the GO@HGC.
Preparation of GN@HGC-S
The sulfur loading process into GN@HGC obtained in Method 2 was the same as in the above Example 1.
Electrochemical Test
The electrochemical measurements were carried out in the same way as in the above Example 1.

Comparative Example 2

The steps in Example 2 were repeated in Comparative Example 2 except that no transition metal-containing salt was added and the carbon source added was not graphitized.
In FIG. 6, the obtained GN@HGC-S cathode composite exhibits discharge capacity of 1375 mAh/g at C/10, and retains at 943 mAh/g after 200 cycles. Moreover, the GN@HGC-S cathode composite shows an excellent rate performance compared to GN@C-S in Comparative Example 2. When increasing the current rates to 1C and 5C, the GN@HGC-S cathode composite still achieves capacities of 900 mAh/g and 765 mAh/g in the initial cycle. However, for the GN@C-S cathode composite, the capacity decreased drastically with less than 300 mAh/g at 2C, implying its slow kinetics property.

Example 3

Preparation of HGCS:
A hydrothermal method was employed to prepare HGCS precursor, in which 4.5 g of D-glucose was dissolved in 30 mL of water, the solution was then sealed in an autoclave and reacted at 180° C. for 4 h to yield the MPCS. The products were centrifuged and washed with water and ethanol for several times before being further dried at 50° C. in an oven. 50 mg of as-obtained MPCS was dispersed in 20 mL of aqueous solution of ferric sulfate ($FeSO_4$) of 100 mg. The suspension then experienced a vigorous stirring of 2 h, and then heated to 90° C. for 1 h to gradually vaporize solvent. The obtained mixture was further dried at 50° C. in an oven and then annealed at 800° C. in an inert gas (such as nitrogen, argon, etc.) for 2 h to 4 h with a heating rate of 5° C./min to carbonize and graphitize the MPCS. To ensure a complete removal of $Fe_xO_y$ NPs, the resulting sample after carbonization was washed continuously with HCl solution and de-ionized water until the pH of the filtrate becomes 7.
Preparation of HGCS-S
The sulfur loading process into HGCS was the same as in the above Example 1.
Electrochemical Test
The electrochemical measurements were carried out in the same way as in the above Example 1.

Comparative Example 3

The steps in Example 3 were repeated in Comparative Example 3 except that no transition metal-containing salt was added and MPCS was not graphitized.
In FIG. 9, the obtained HGCS-S cathode composite exhibits discharge capacity of 1325 mAh/g at C/10, and retains at 861 mAh/g after 200 cycles. Moreover, the HGCS-S cathode composite shows an excellent rate performance. When increasing the current rates to 1C and 2C, the HGCS-S cathode composite still achieves capacities of 845 mAh/g and 770 mAh/g in the initial cycle.
In addition, the ratio of $I_G/I_D$ in Raman spectrum of the above Examples 1-3 and Comparative Examples 1-3 was summarized in the following Table 1.

TABLE 1

| | $I_G/I_D$ (without graphitization) | $I_G/I_D$ (high graphitization) |
|---|---|---|
| CNT @ C vs. CNT @ HGC | 0.63 (Comparative Example 1) | 1.04 (Example 1) |
| GN @ C vs. GN @ HGC | 0.82 (Comparative Example 2) | 1.23 (Example 2) |
| MPCS vs. HGCS | 0.74 (Comparative Example 3) | 1.28 (Example 3) |

The invention claimed is:
1. A process for preparing a sulfur-carbon composite, wherein the sulfur-carbon composite comprises a highly graphitic carbon material and sulfur, wherein the highly graphitic carbon material has a porous structure and a high graphitization degree characterized by a ratio of the intensity of G band to the intensity of D band in Raman spectrum being more than 1.0, said material being a core-shell material with a conductive core coated by a graphitic microporous carbon layer, and wherein sulfur is encapsulated into the porous structure of the highly graphitic carbon material,
the process comprising:
mixing an aqueous suspension of the conductive core with an aqueous solution of transition metal-containing salt, keeping at 60-120° C. for 2-12 h, carrying out a hydrothermal reaction by adding carbon source to the obtained product, followed by centrifuging, washing and drying; or alternatively, mixing an aqueous suspension of the conductive core with an aqueous solution of transition metal-containing salt and carbon source at the same time, then carrying out a hydrothermal reaction, followed by centrifuging, washing and drying,
pyrolyzing the obtained material at a temperature of 500-900° C. for 1-12 h;
removing the transition metal oxide by an acid solution; and
loading of sulfur.
2. A process for preparing a sulfur-carbon composite, wherein the sulfur-carbon composite comprises a highly graphitic carbon material and sulfur, wherein the highly graphitic carbon material has a porous structure and a high graphitization degree characterized by a ratio of the intensity of G band to the intensity of D band in Raman spectrum being more than 1.0, said material being a graphitic microporous carbon substrate, and wherein sulfur is encapsulated into the porous structure of the highly graphitic carbon material,
the process comprising the steps of:
dispersing microporous carbon substrate in an aqueous solution of transition metal-containing salt, stirring and heating at 60-120° C. for 2-12 h;
pyrolyzing the obtained material at a temperature of 500-900° C. for 1-12 h to carbonize and graphitize the microporous carbon substrate;
removing the transition metal oxide by an acid solution; and
loading of sulfur.
3. The process according to claim 1, wherein said carbon source is one or more selected from the group consisting of sucrose, D-glucose, fructose, polyaniline, polyacetylene, polythiophene, dopamine and sodium alginate.

4. The process according to claim 1, wherein the transition metal-containing salt is selected from the group consisting of chloride, sulfate, nitrate, acetate, carbonate and phosphate of Fe, Co and Ni.

5. The process according to claim 1, wherein the sulfur loading comprises mixing homogeneously the carbon material obtained after removing the transition metal oxide with a solution of sulfur dissolved in a non-polar solvent by ultrasonication, and then adding a polar solvent to precipitate sulfur particles from the solution and deposite into the carbon material, followed by drying.

6. The process according to claim 2, wherein the transition metal-containing salt is selected from the group consisting of chloride, sulfate, nitrate, acetate, carbonate and phosphate of Fe, Co and Ni.

7. The process according to claim 2, wherein the sulfur loading comprises mixing homogeneously the carbon material obtained after removing the transition metal oxide with a solution of sulfur dissolved in a non-polar solvent by ultrasonication, and then adding a polar solvent to precipitate sulfur particles from the solution and deposite into the carbon material, followed by drying.

* * * * *